Oct. 30, 1956  E. J. FREY  2,768,791
MIXING VALVE
Filed May 5, 1953  5 Sheets-Sheet 1
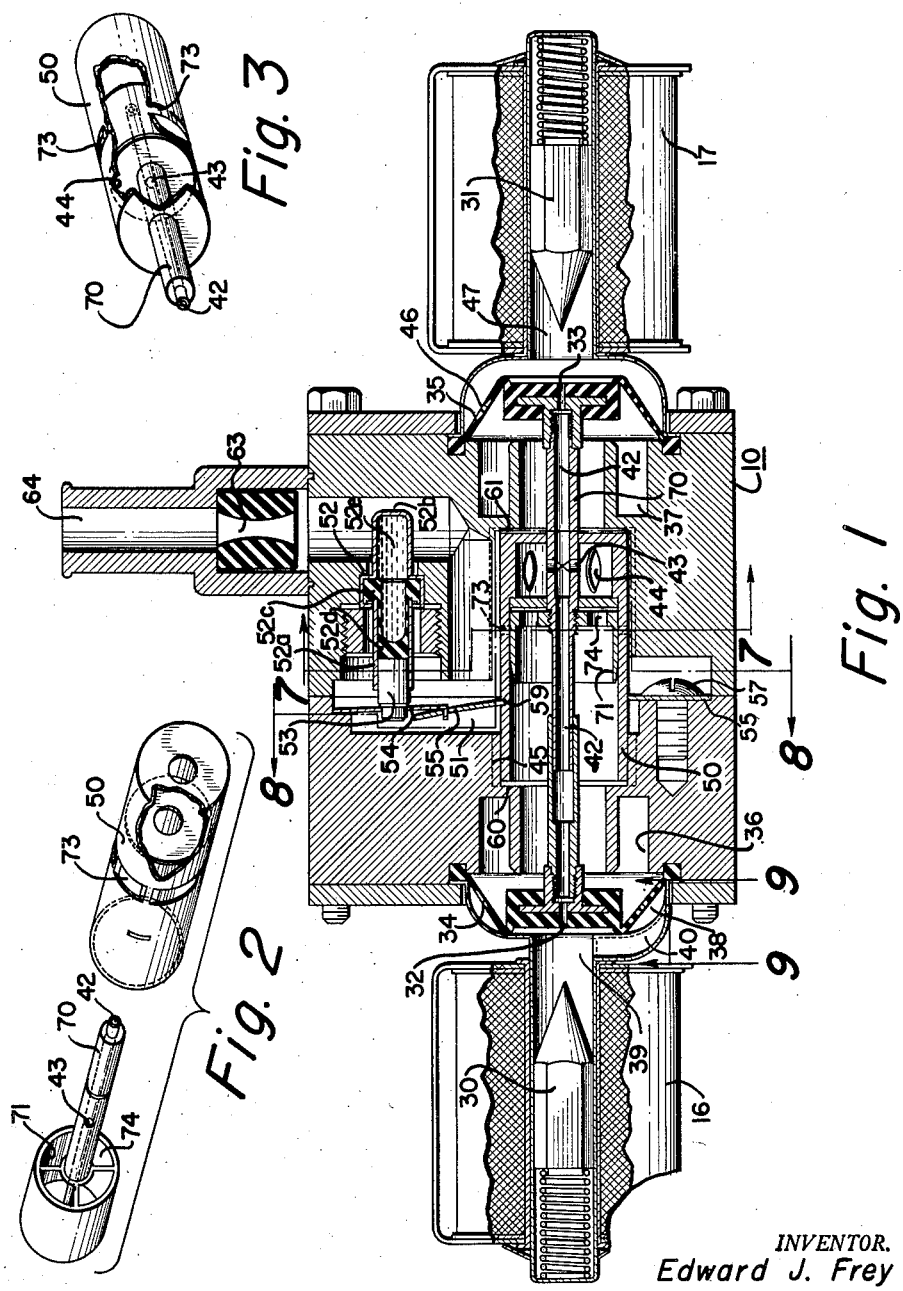
INVENTOR.
Edward J. Frey
BY
His Attorney Oct. 30, 1956  E. J. FREY  2,768,791
MIXING VALVE Filed May 5, 1953  5 Sheets—Sheet 2

INVENTOR.
Edward J. Frey
BY
R R Caudor
His Attorney

Oct. 30, 1956  E. J. FREY  2,768,791
MIXING VALVE

Filed May 5, 1953  5 Sheets-Sheet 3

INVENTOR.
Edward J. Frey
BY
His Attorney

Oct. 30, 1956  E. J. FREY  2,768,791
MIXING VALVE
Filed May 5, 1953  5 Sheets-Sheet 4
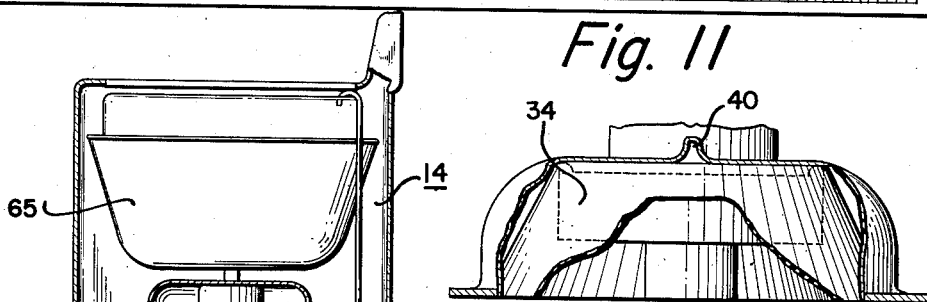
Fig. 11
Fig. 9
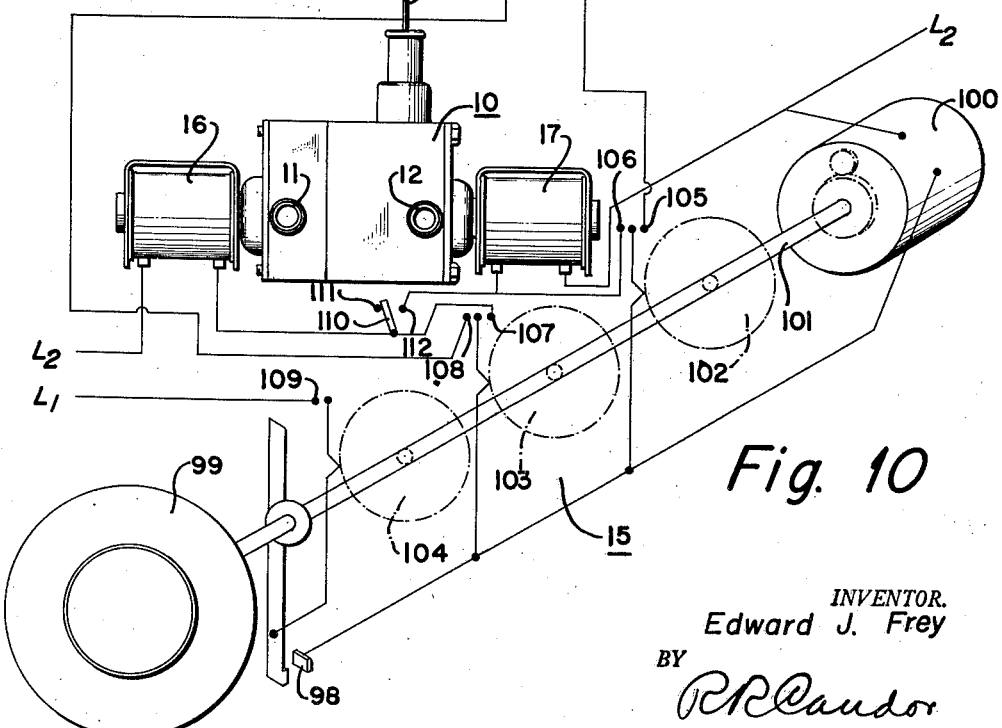
Fig. 10
INVENTOR.
Edward J. Frey
BY
His Attorney INVENTOR.
Edward J. Frey

United States Patent Office 2,768,791
Patented Oct. 30, 1956

2,768,791

MIXING VALVE

Edward J. Frey, Dayton, Ohio, assignor to General Motors Corporation, Detroit, Mich., a corporation of Delaware Application May 5, 1953, Serial No. 353,064

5 Claims. (Cl. 236—12)

This application relates to domestic appliances, and more particularly to mixers for clothes washing machines.

An object of this invention is to provide a thermostatic mixer which will permit free flow of one liquid only when so desired.

Another object of this invention is to provide a thermostatic mixer with a thermostatically actuated sleeve for controlling the mixing of two liquids, the sleeve having a by-pass to be opened only when one liquid is to be delivered.

Another object of this invention is to provide a solenoid actuated thermostatic mixer provided with hot and cold independently movable pilot valves in which the cold pilot valve opens a hot water by-pass in a thermostatically controlled sleeve valve to provide an all hot water passageway when the cold water pilot valve is closed.

Further objects and advantages of the present invention will be apparent from the following description, reference being had to the accompanying drawings wherein a preferred embodiment of the present invention is clearly shown.

In the drawings:

Figure 1 is a longitudinal cross-section of the thermostatic mixer;

Figure 2 is an exploded view in perspective of the thermostatic sleeve and by-pass control plunger;

Figure 3 is a view in perspective showing the parts of Figure 2 in assembled position;

Figure 9 is an elevation, with parts broken away, of the hot water pilot valve;

Figure 10 is a diagrammatic representation of the mixer combined with a washing machine and a timer control;

Figure 11 is a chart indicating a sequence of operations for the mechanism disclosed in Figure 10;

Figure 4:
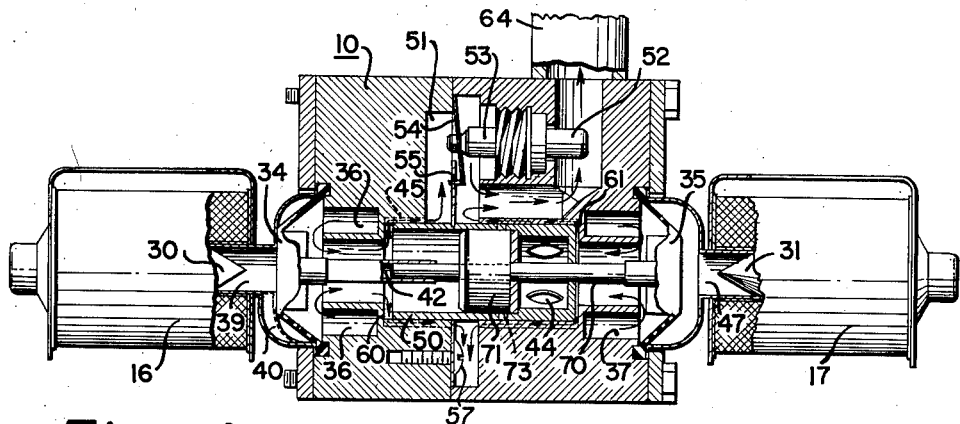
Figure 4 is a view, somewhat similar to Figure 1, on a reduced scale, and showing the position of the parts when hot and cold water are being mixed and when the hot water is not very hot.

Referring to Figs. 10 and 11, the thermostatic mixer 10 is adapted to feed hot water from the inlet 11 and cold water from the inlet 12, through the pipe 13 to the washing machine 14. The washing machine may be of the type described in the patent to Clark, 2,366,236, patented January 2, 1945. The mixer 10 is controlled by a timer 15, which has various switch contacts to actuate the washing machine 14 and the solenoids 16 and 17. The sequence of operations will be more fully described as the description proceeds.

Figures 12, 13:
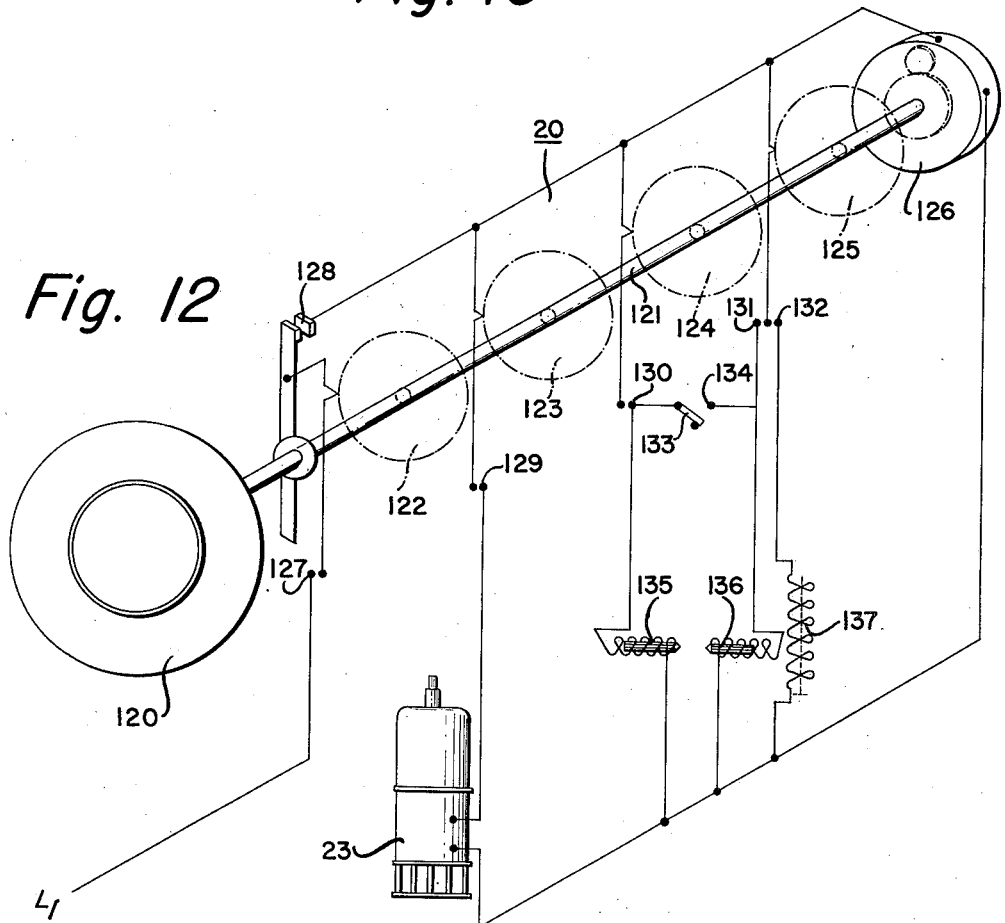
Figure 12 is a diagrammatic representation, somewhat similar to Figure 10 but showing a slightly different control.
Figure 13 is a chart showing a sequence of operation suitable for the apparatus shown in Figure 12.

Referring to Figure 12, the timer 20 controls the hot solenoid 135, cold solenoid 136, washing machine motor 23, washing machine selector solenoid 137, in a manner similar to that disclosed in Figure 10, but producing a slightly different sequence of operations as indicated in Figure 13, and which will be more fully described hereafter.

Figure 7:
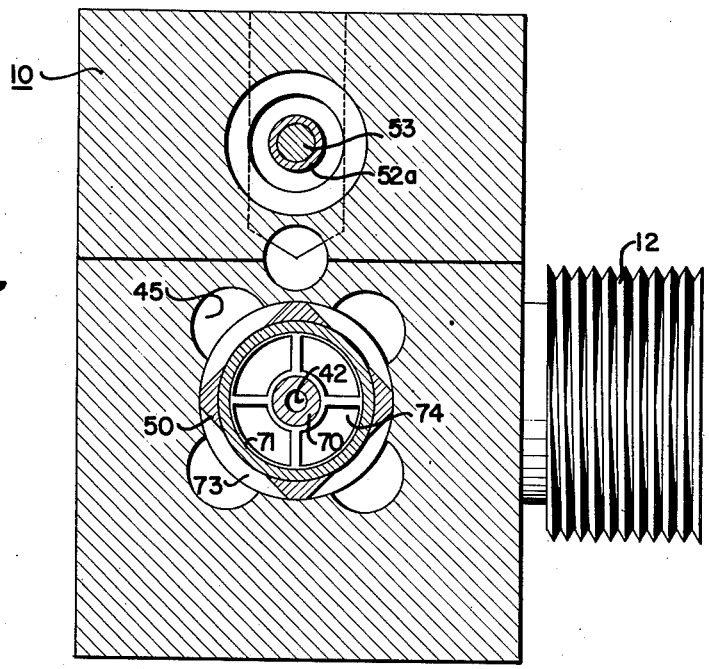
Figure 7 is a view taken along the line 7—7 of Figure 1.

The thermostatic mixer 10, as shown in Figure 1, includes the hot and cold solenoids 16 and 17 having spring pressed plungers 30 and 31 adapted to engage the pilot openings 32 and 33 in the diaphragms 34 and 35. The hot water inlet 11 of Figs. 8 and 10 feeds into the space 36 of Fig. 1, while the cold water inlet 12 of Figures 7 and 10 feeds into the space 37 of Figure 1. The hot water can flow through an orifice 38 in diaphragm 34 and into the solenoid plunger space 39 through the by-pass channel 40. From space 39, the hot water can flow through an opening 32 into the passageway 42 and from thence through the openings 43 and 44 into cloverleaf-like passageways 45, more easily seen in Figs. 7 and 8, and from there to the mixer outlet 64. The flow capacity of opening 32 is more than that of opening 38 to produce the pilot action of the diaphragm 34, well known in this art.

The cold water from inlet 12 and space 37 flows through the diaphragm opening 46 into the solenoid plunger space 47 and from thence through the pilot opening 33 into the passageway 42 heretofore described. The flow capacity of pilot opening 33 is more than that of diaphragm opening 46 to produce the well-known pilot action.

Figure 8:
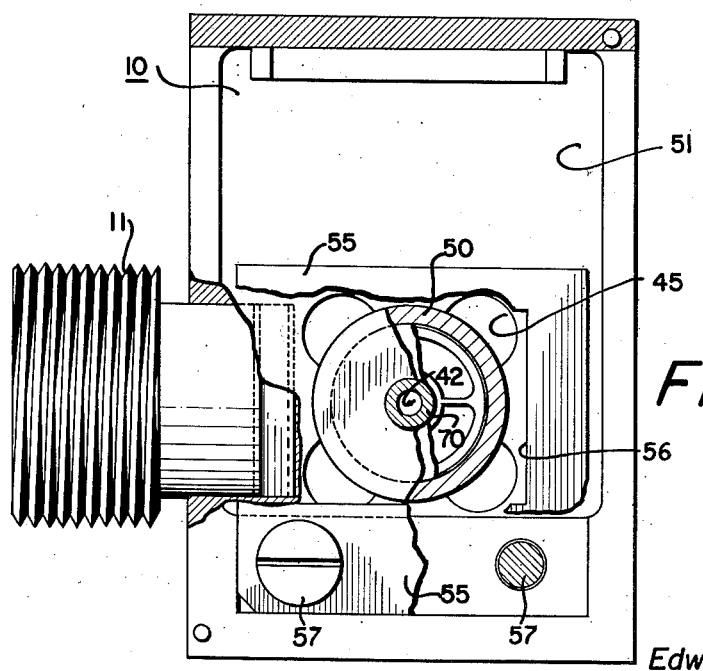
Figure 8 is a view taken along the line 8—8 of Figure 1.

The hot or mixed water flowing through the passages 45, surrounding the thermostatic sleeve 50, flows into the thermostatic chamber 51 where the temperature of the water affects the thermostatic element 52 to produce longitudinal movement of the plunger 53. A leaf spring 55 having a central opening 56, as more particularly shown in Fig. 8 is secured to mixer housing 10 by cap screws 57. The central opening 56 in spring 55 is spaced from sleeve 50 except for a top portion 59 of the opening that fits tightly within a groove formed in sleeve 50. With this construction, the leaf spring is fixed at its lower end but the remainder of the spring is free to move with the sleeve 50. When plunger 53 is thermostatically actuated it moves a lever 54 which in turn moves leaf spring 55 and sleeve 50. The sleeve 50 moves to and away from the shoulders 60 and 61 to vary the proportions of the hot and cold water flowing through the mixture structure and thus to maintain a substantially constant temperature in the mixture. The thermostat 52, by way of example, may include sleeves 52a and 52b pinching the flange 52c of a flexible cup 52d. The cup 52d actuates the plunger 53 in response to the thermostatic change in volume of expansible material 52e.

If desired, the water from thermostatic chamber 51 may flow through a flow control orifice 63 which contracts and expands under flow pressure to provide a substantially constant flow of water through the outlet 64 and from thence to the pipe 13 of Figure 10 and to the tub 65 of the washing machine 14. A measured quantity of water may be delivered to the tub during measured intervals of time under the control of the timer.

Referring more particularly now to Fig. 4, assume that solenoids 16 and 17 have been energized by the timer, permitting both hot and cold water to flow into the mixer 10. Assume also that the hot water is not very hot, and accordingly the resulting mixed water tends to be at a temperature slightly below the theoretical selected temperature. Under these conditions, the thermostatic plunger 53 has been slightly retracted to the right, in turn moving the sleeve 50 slightly to the right. This increases the proportion of hot water flowing past the shoulder 60 in comparison to the flow of cold water past the shoulder 61, and this tends to maintain the temperature of the mixed water, within permissible limits, near the selected temperature.

Figure 5:
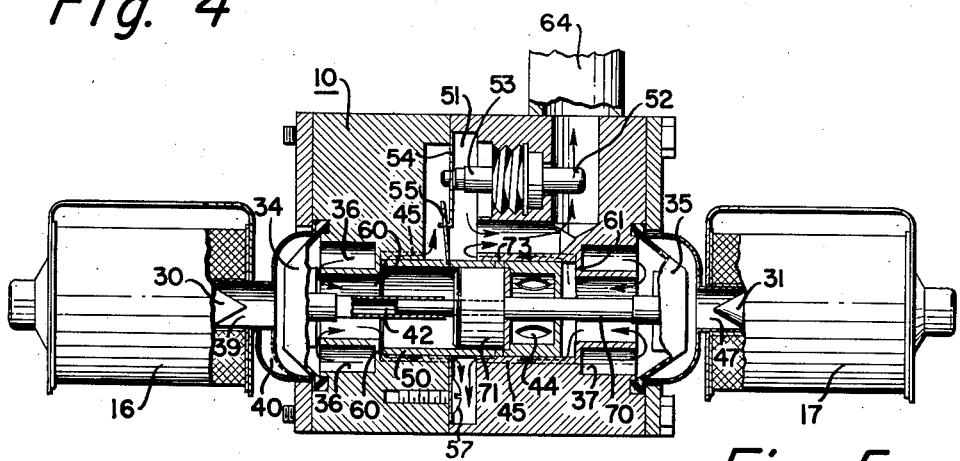
Figure 5 is a view similar to Figure 4, but showing the position of the parts when the hot water is very hot.

Referring to Fig. 5, assume that the hot water is very hot, so that the resulting temperature of the mixed water in chamber 51 is slightly higher than the theoretical selected temperature. Under this condition, the thermostatic plunger 53 is moved slightly to the left, in turn moving the sleeve 50 slightly to the left. This decreases the amount of hot water flowing past the shoulder 60 in comparison to the amount of cold water flowing past the shoulder 61. This in turn, tends to limit the increase of temperature of the mixed water and to keep it constant within permissible limits.

A change in cold water temperature also affects the thermostatic action, as is apparent.

Figure 6:
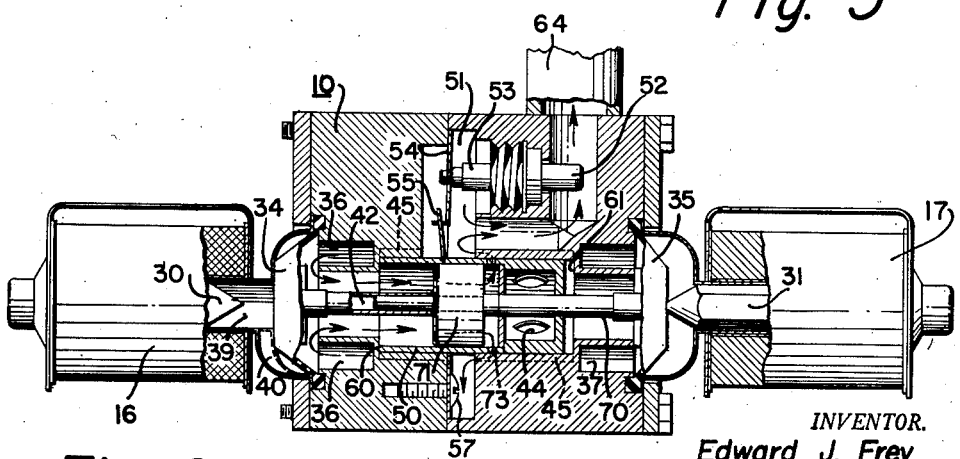
Figure 6 is a view similar to Figures 4 and 5, but showing the position of the parts when only hot water is being used.

Referring to Fig. 6, assume that hot water only is to be delivered, and consequently, only the solenoid 16 has been energized by the timer. Under these conditions, the cold plunger 31 has remained spring-pressed against the diaphragm 35 causing the cold water pressure to maintain the diaphragm 35 to the left. This, in turn, maintains the pipe 70 and the plunger 71, which is attached thereto, also to the left sufficiently to maintain open the by-pass orifices 73 in the sleeve 50. The orifices 73 connect with the cloverleaf-like passageways 45. Under these conditions, hot water can flow from the chamber 36 directly through the sleeve 50 and through openings 74 in plunger 71 to the orifices 73 and from thence to the mixed water chamber 51 and out to the outlet 64. The thermostatic element has moved the plunger 53 to the extreme left, and consequently, has moved the sleeve 50 against the shoulder 60, completely closing the normal hot water passage. However, the orifices 73 permit a free flow of hot water through the valve structure without being affected by the action of the thermostat.

In Fig. 10, the timer 15, by way of example, may be of the character disclosed in K. O. Sisson Patent No. 2,520,695, granted August 29, 1950, with or without the lid switch (57) of the patent. The timer is provided with a knob 99 and is driven by a timer motor 100 which produces a step-by-step turning movement of the shaft 101 and of the cams 102, 103 and 104 to open and close upon the stationary switch contacts 105, 106, 107, 108 and 109. In Fig. 11, when the timer knob is turned to start and is pushed in (as described in the Sisson patent), the contacts 98, 107 and 109 are closed to energize the timer motor 100 and the hot solenoid 16. This starts a hot water filling action which continues for four minutes. At four minutes, cam 103 closes contact 108, energizing the washer motor and the agitator, as more fully described in the patent to Kendall Clark, No. 2,422,395, granted June 17, 1947. Agitation action in the washing machine continues until the 14th minute, at which time the spin solenoid 113 (62 of the latter Clark patent) is energized by the closing of contact 105 to cause a spinning action until the 15½ minute. Thereafter, there is a half-minute pause (except in the timer motor) until the 16th minute when the cold and hot water solenoids 16 and 17 are energized by the closing of contacts 107 and 106 to provide a mixed water fill the tub 65. The spin continues to the 20th minute. At that time, the washing machine motor and the agitator are energized by the closing of contact 108 to the 21½ minute, at which time the spin solenoid 113 is energized by closing contact 105 to the 23rd minute when both the washing machine motor and the solenoid are deenergized. Another half-minute pause is provided to the 23½ minute when both the hot and cold solenoids 16 and 17 are energized once again by closing contacts 106 and 107 to fill the tub with mixed hot and cold water to the 27½ minute. At the 27th minute the washer motor and the agitator are energized to provide a half-minute of overflow with agitation. The overflow stops at 27½ minutes by the deenergization of the hot and cold solenoids, but the agitation continues to the 29th minute at which time the spin solenoid 113 is energized by closing contact 105 to provide a spin operation to the 32nd minute, which terminates the washing operation.

The switch 110 may be moved to open position 111, to provide hot water only when contact 107 is energized. The switch 110 may be moved to contact 112 to provide mixed or tepid water when contact 107 is energized, since this simultaneously opens cold solenoid 17, as indicated by a dotted line in Fig. 11.

Referring to Figs. 12 and 13, the sequence of operations and construction of the timer switch are similar to those described with respect to Figures 10 and 11. The timer 20 is provided with a knob 120, shaft 121, cams 122, 123, 124 and 125, timer motor 126, stationary contacts 127, 128, 129, 130, 131 and 132, tepid switch 133 with stationary contact 134.

When the knob 120 is placed at start and is pushed in, contacts 127, 128 and 130 are closed to energize the hot solenoid 135. A filling operation is started and continues to the 4th minute. At that time, contact 130 is opened and contact 129 is closed to produce a washing action. This operation continues to the 14th minute, at which time the hot and cold solenoids 135 and 136 are energized, by the closing of contacts 130 and 131, while agitation continues to the 15½ minute, thus providing an overflow washing action. At the 15½ minute, the spin solenoid 137 (corresponding to 113 of Fig. 10 and to 62 of the latter Clark patent) is energized until the 17½ minute, at which time hot and cold solenoids 135, 136 are energized to provide a continuous flow of water to the 23½ minute. In the meantime, at the 21st minute, the washer motor and the agitator are energized to provide a combined agitation and overflow condition to the 23½ minute. At this time, a spin operation starts and continues to the 27½ minute, when the entire washing operation is completed.

During all of these operations, if the hot and cold solenoids are energized, the flow of water is as previously described with respect to Figures 4 and 5, depending upon the temperature of the hot and cold water. When only the hot solenoid is energized, the operation is as previously described with respect to Figure 6.

This application is a continuation-in-part of my co-pending application, S. N. 321,258, filed November 18, 1952, for Domestic Appliance.

Any suitable known expansible material may be used at 52e in the thermostat. However, I prefer to use the expansible materials used and claimed in my concurrently filed application for Domestic Appliance S. N. 353,065, filed May 5, 1953.

While the form of embodiment of the invention as herein disclosed constitutes a preferred form, it is to be understood that other forms might be adopted, as may come within the scope of the claims which follow.

What is claimed is as follows:

1. A mixer having a hot fluid inlet, a cold fluid inlet, a fluid outlet, a common passageway for flow of fluid from said inlets to said outlet, pilot operated shut-off valves for said inlets, a metering sleeve interposed between said shut-off valves and said common passageway, a thermostat in said common passageway actuating said sleeve in response to fluid temperature in said passageway, said metering sleeve operating to proportion the flow of hot and cold fluid between said inlets and said common passageway by decreasing the flow of one of said fluids and increasing the flow of the other of said fluids when said sleeve is actuated by said thermostat, a fluid by-pass in said sleeve for flow of fluid independently of control by said thermostat, a by-pass valve disposed within said metering sleeve operable by the closing of one of said shut-off valves independently of the position of said metering sleeve, to feed fluid from the other of said shut-off valves independently of control by said thermostat.

2. A mixer having a hot fluid inlet, a cold fluid inlet, a fluid outlet, a common passageway for flow of fluid from said inlets to said outlet, pilot operated shut-off valves for said inlets, a metering sleeve interposed between said shut-off valves and said common passageway, a thermostat in said common passageway actuating said sleeve in response to fluid temperature in said passageway, said metering sleeve operating to proportion the flow of hot and cold fluid between said inlets and said common passageway by decreasing the flow of one of said fluids and increasing the flow of the other of said fluids when said sleeve is actuated by said thermostat, a fluid by-pass in said sleeve for flow of fluid independently of control by said thermostat, a by-pass valve disposed within said metering sleeve operable by the closing of the shut-off valve for cold fluid independently of the position of said metering sleeve, to feed hot fluid from the other shut-off valve independently of control by said thermostat.

3. A mixer having a hot fluid inlet, a cold fluid inlet, a fluid outlet, a common passageway for flow of fluid from said inlets to said outlet, solenoid operated pilot shut-off valves for said inlets, a metering sleeve interposed between said pilot shut-off valves and said common passageway, a thermostat in said common passageway actuating said sleeve in response to fluid temperature in said passageway, said metering sleeve operating to proportion the flow of hot and cold fluid between said inlets and said common passageway by decreasing the flow of one of said fluids and increasing the flow of the other of said fluids when said sleeve is actuated by said thermostat, a fluid by-pass in said sleeve for flow of fluid independently of control by said thermostat, a by-pass plunger in said sleeve operable without disturbing the thermostatic setting of said sleeve, and connections between said plunger and pilot valves to operate said plunger to open a by-pass when one of said pilot shut-off valves is open and the other pilot shut-off valve is closed.

4. A thermostatic mixer having a hot fluid inlet, a cold fluid inlet, a fluid outlet, a common passageway for flow of fluid from said inlets to said outlet, a thermostat in said common passageway, solenoid operated diaphragm valves for said inlets having pilot openings, a mixing sleeve interposed between said inlets and outlet operated by said thermostat, said mixing sleeve operating to proportion the flow of hot and cold fluid between said inlets and said common passageway by decreasing the flow of one of said fluids and increasing the flow of the other of said fluids when said sleeve is actuated by said thermostat, a fluid by-pass in said sleeve for flow of fluid independently of control by said thermostat, a tube attached to said diaphragms and connecting the pilot openings in said diaphragms, a plunger within said sleeve and fixed to said tube and operable to open said by-pass independently of the position of said sleeve whenever one only of said solenoid operated diaphragm valves is opened.

5. A thermostatic mixer having a hot fluid inlet, a cold fluid inlet, a fluid outlet, a common passageway for flow of fluid from said inlets to said outlet, a thermostat in said common passageway, solenoid operated diaphragm valves for said inlets having pilot openings, a mixing sleeve interposed between said inlets and outlet operated by said thermostat, said mixing sleeve operating to proportion the flow of hot and cold fluid between said inlets and said common passageway by decreasing the flow of one of said fluids and increasing the flow of the other of said fluids when said sleeve is actuated by said thermostat, a fluid by-pass in said sleeve for flow of fluid independently of control by said thermostat, a tube attached to said diaphragms and connecting the pilot openings in said diaphragms, a plunger within said sleeve and fixed to said tube and operable to open said by-pass independently of the position of said sleeve whenever diaphragm valve for said hot fluid inlet is maintained open while the other diaphragm valve is maintained closed.

References Cited in the file of this patent
UNITED STATES PATENTS

| | | |
|---|---|---|
| 2,269,259 | Fields | Jan. 6, 1942 |
| 2,508,074 | Miller | May 16, 1950 |
| 2,528,422 | Chace | Oct. 31, 1950 |
| 2,620,133 | Obermaier | Dec. 2, 1952 |
| 2,708,551 | Record | May 17, 1955 |